US008397487B2

(12) United States Patent
Sennoun et al.

(10) Patent No.: US 8,397,487 B2
(45) Date of Patent: Mar. 19, 2013

(54) ENVIRONMENTAL CONTROL SYSTEM SUPPLY PRECOOLER BYPASS (75) Inventors: Mohammed El Hacin Sennoun, West Chester, OH (US); Nicholas Rowe Dinsmore, Cincinnati, OH (US); Brandon Wayne Miller, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/036,534

(22) Filed: Feb. 28, 2011

(65) Prior Publication Data

US 2012/0216545 A1 Aug. 30, 2012

(51) Int. Cl.
*F02K 99/00* (2009.01)
*F02C 6/08* (2006.01)
*F02C 6/04* (2006.01)

(52) U.S. Cl. .............. 60/266; 60/782; 60/785
(58) Field of Classification Search .......... 60/266, 60/728, 772, 782, 785
See application file for complete search history.

(56) References Cited

U.S. PATENT DOCUMENTS

| | | | |
|---|---|---|---|
| 3,981,466 A | 9/1976 | Shah | |
| 4,091,613 A * | 5/1978 | Young | 60/785 |
| 4,254,618 A | 3/1981 | Elovic | |
| 4,404,793 A | 9/1983 | Coffinberry | |
| 4,482,114 A | 11/1984 | Gupta et al. | |
| 4,550,561 A * | 11/1985 | Coffinberry | 60/782 |
| 5,137,230 A | 8/1992 | Coffinberry | |
| 5,161,364 A * | 11/1992 | Bruun et al. | 60/772 |
| 5,860,283 A | 1/1999 | Coleman et al. | |
| 6,202,403 B1 | 3/2001 | Laborie et al. | |
| 6,629,428 B1 | 10/2003 | Murry | |
| 7,536,865 B2 * | 5/2009 | Mikhail | 60/782 |
| 7,823,389 B2 | 11/2010 | Seitzer et al. | |
| 7,856,824 B2 | 12/2010 | Anderson et al. | |
| 8,033,118 B2 * | 10/2011 | Monteiro et al. | 60/795 |
| 2008/0112797 A1 | 5/2008 | Seitzer et al. | |
| 2010/0192593 A1* | 8/2010 | Brown et al. | 60/782 |
| 2010/0323601 A1 | 12/2010 | Cremers et al. | |

OTHER PUBLICATIONS

"Pneumatic System", http://www.boeing-727.com/Data/systems/infopneumat.html, Jan. 27, 2011, 4 pages.
"Air Systems—Pneumatics", Boeing 757 Air Systems :: Pneumatics, http://www.biggles-software.com/software/757_tech/air_systems/pneumatics.htm, Jan. 27, 2011, 3 pages.

* cited by examiner

*Primary Examiner* — William H Rodriguez
*Assistant Examiner* — Arun Goyal
(74) *Attorney, Agent, or Firm* — General Electric Company; William Scott Andes; David J. Clement (57) ABSTRACT A precooler for cooling compressor bleed air for an environmental control system includes a heat exchanger in fluid communication with a source of cooling air and operable for cooling the bleed air. A variable bypass valve between a bleed air source and environmental control system is operable for bypassing at least a portion of the compressor bleed air around the heat exchanger. The cooling air may be a portion of fan air modulated by a variable fan air valve. The bleed air source may be selectable between the low pressure bleed air source and a high pressure bleed air source. One method includes flowing the compressor bleed air from a single low pressure source only and increasing thrust sufficiently to meet a minimum level of pressure of the bleed air during one engine out aircraft operating condition during approach or loitering.

22 Claims, 5 Drawing Sheets

ENVIRONMENTAL CONTROL SYSTEM SUPPLY PRECOOLER BYPASS

BACKGROUND OF THE INVENTION

1. Technical Field

The present invention relates generally to aircraft environmental control systems (ECS) and, more specifically, to gas turbine engine compressor air supply to aircraft environmental control systems.

2. Background Information

Environmental control systems (ECS) on board aircraft are used to condition air for the cabin and crew as well as providing cooling for avionics and/or other equipment needing cooling. Some environmental control systems bleed compressed air from the compressor of an aircraft gas turbine engine or of an auxiliary power unit. In a typical closed loop ECS, working fluid passes around a closed loop between a compressor, an intercooler, a turbine driving the compressor and a heat exchanger which extracts heat from the equipment or volume to be cooled.

Bleed air is passed through a precooler to help regulate the temperature and pressure of the bleed air delivered to meet the pneumatic services of the airplane, such as water pressurization, wing and engine anti-ice protection, hydraulic pumps, trim air for cabin warming, and the like. Engine bleed air comes from either a high pressure (HP) or low pressure (LP) engine compressor sections or stages. LP air is used during high power setting operations and HP air is used during descent and other low power setting operations. Control of a HP valve is typically automatic. During low engine thrust operation, the HP valve is open allowing high pressure air to power the system. As thrust is increased, the HP valve automatically closes and an LP check valve opens to supply bleed air allowing low pressure air to power the system.

Engine bleed air is ducted through an air supply precooler. The precooler is a crossflow, air to air, heat exchanger which uses engine fan air as its cooling medium. Fan air is routed to the precooler through the fan air modulating valve which is attached to the bottom of the precooler. The fan air modulating valve regulates the air flow to the precooler based on control air pressure and temperature from fan air pressure and temperature sensors.

Precooled air for the ECS travels through air conditioning packs to provide essentially dry, sterile, and dust free conditioned air to the airplane cabin. This conditioned air is then mixed with a predetermined amount of cabin recirculated air and delivered to the aircraft cabin. Trim air, taken downstream of precooler, may be added to warm the conditioned air to a suitably comfortable level for the aircraft cabin.

Modern turbofan engines with high 5 to 1 or higher bypass ratios have good fuel consumption but produce less compressed air available for ECS. Extracting bleed air for ECS results in a fuel consumption penalty as does the weight of the precooler. A typical precooler is sized for what is referred to in the art as a one engine out heavy hold engine operating condition. This condition is for a fully loaded aircraft, with one engine out, and an engine operating at a relatively low RPM or power level such as might be used in a loitering or approach flight conditions.

This design flight condition may require twice the compressed bleed air a normal operating condition would require due to engine out, thus, not only increasing fuel consumption but also requiring a larger and heavier precooler. With rising fuel costs and the development of more efficient engines, it is highly desirable to decrease the amount of compressed air used by and the weight of ECS precoolers.

BRIEF DESCRIPTION OF THE INVENTION

A gas turbine engine compressor bleed air supply system includes a compressor air supply precooler for cooling compressor bleed air from a bleed air source and operably connected in supply flow communication with an environmental control system. The precooler includes an air-to-air heat exchanger in fluid communication with a source of cooling air and operable for cooling the compressor bleed air. A variable bypass valve disposed between the bleed air source and environmental control system. The variable bypass valve is operable for bypassing at least a portion of the compressor bleed air around the heat exchanger.

The bleed air source may be a low pressure bleed air source disposed between first and last stages of the high pressure compressor, the cooling air may be a portion of fan air from the gas turbine engine, and a variable fan air valve may be disposed between the source of cooling air and the heat exchanger. The bleed air source may be selectable between the low pressure bleed air source and a high pressure bleed air source. The low and high pressure bleed air sources may be intermediate and last stages of a gas turbine engine high pressure compressor.

A more particular embodiment includes a bleed air inlet line connected to and in selective flow communication with the low and high pressure bleed air sources and the bleed air inlet line is connected to and in flow communication with a heat exchanger cooling circuit in the air-to-air heat exchanger for cooling the compressor bleed air. A bleed air outlet line connects the heat exchanger cooling circuit to the environmental control system. The variable bypass valve is a bypass throttle valve disposed in a bleed air bypass line between the bleed air inlet line and the bleed air outlet line. A high pressure bleed shutoff valve is disposed in a high pressure bleed line between the high pressure bleed air source and the bleed air inlet line and an electronic control is controllingly connected to the bypass throttle valve and the variable fan air valve. The electronic control may be controllingly connected to the high pressure bleed shutoff valve.

The precooler may be an integrated precooler including an integrated variable precooler bypass for bypassing the compressor bleed air around the heat exchanger. A bleed air inlet line connected to and in selective flow communication with the low and high pressure bleed air sources is also connected to and in flow communication with a diffuser of the integrated variable precooler bypass. The diffuser is in selective flow communication with the air-to-air heat exchanger for cooling at least a portion of the compressor bleed air and in selective flow communication with a bypass duct in the integrated precooler. The heat exchanger and the bypass duct are in parallel flow relationship and in flow communication with an exhaust outlet of the integrated precooler. A bleed air outlet line connects the exhaust outlet to the environmental control system and the variable bypass valve includes a bypass door disposed between the heat exchanger and the bleed air inlet line. An electronic control may be controllingly connected to the variable bypass valve and the variable fan air valve.

An aircraft including two or more aircraft gas turbine engines and an environmental control system within the aircraft incorporates the gas turbine engine compressor bleed air supply system. Each aircraft gas turbine engine includes in serial flow communication a fan, a high pressure compressor, an annular combustor, a high pressure turbine for powering the high pressure compressor, and a low pressure turbine for powering the fan. An annular nacelle surrounds the fan and a core cowl surrounds the high pressure compressor, the combustor, and the high pressure turbine. The annular bypass duct is located radially between the annular nacelle and the core cowl.

DETAILED DESCRIPTION OF THE INVENTION

Figure 1:
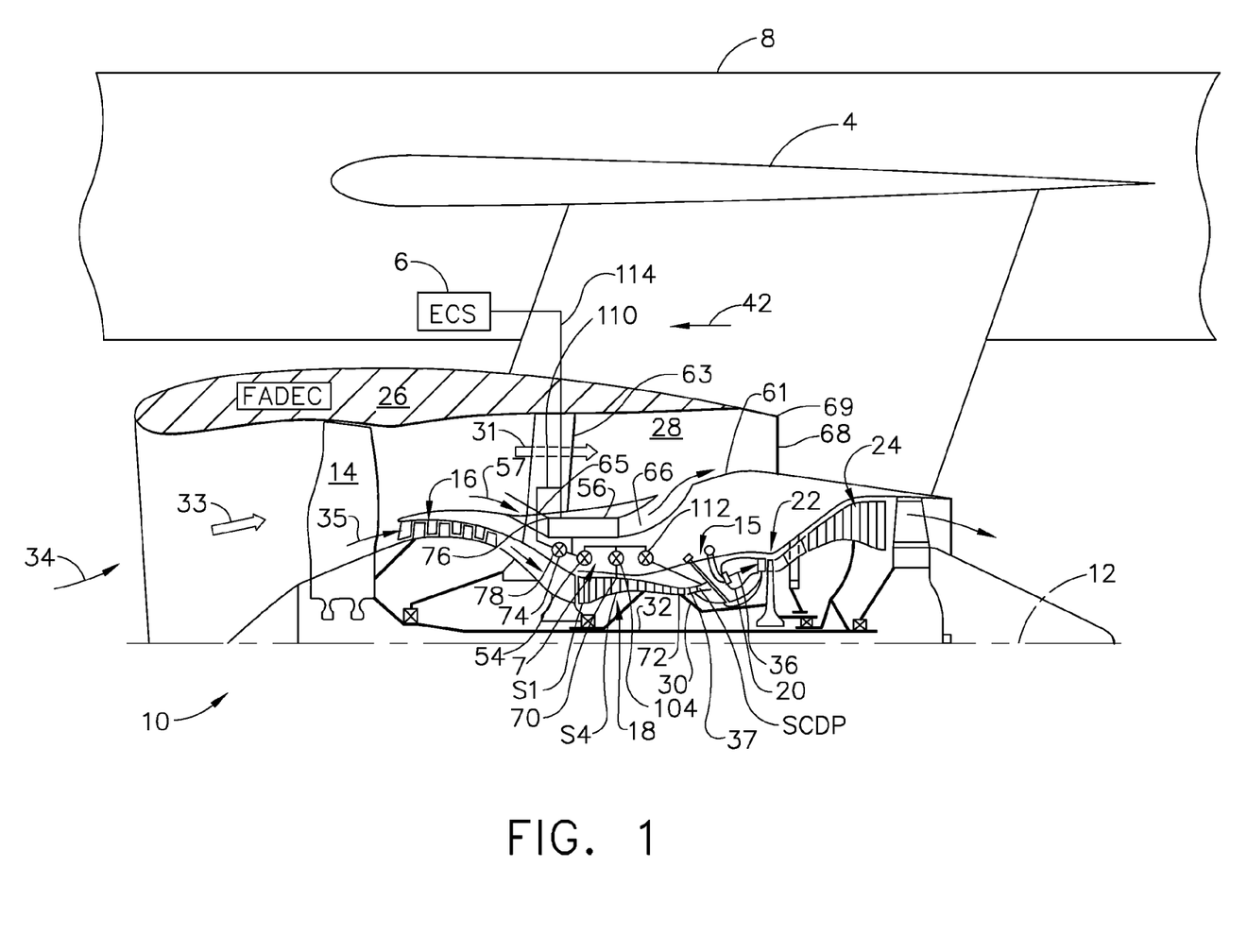
FIG. 1 is an axial sectional schematic view illustration of a gas turbine engine having a compressor bleed air supply system with a precooler and a precooler bypass for an environmental control system for an aircraft.

Illustrated schematically in FIG. 1 is an exemplary turbofan aircraft gas turbine engine 10 mounted to a wing 4 of an aircraft 8. The engine 10 is axisymmetrical about a longitudinal or axial centerline axis 12 and is suitably mounted to the wing or fuselage of the aircraft 8. The engine includes, in downstream serial flow communication, a fan 14, a low pressure or booster compressor 16, a high pressure compressor 18, an annular combustor 20, a high pressure turbine (HPT) 22, and a low pressure turbine (LPT) 24. A typical aircraft 8 has two or more engines 10.

An annular nacelle 26 surrounds the fan 14 and defines an annular bypass duct 28 extending aft around the booster compressor 16. A first drive shaft 30 joins the HPT 22 to the HP compressor 18, and a second drive shaft 32 joins the LPT 24 to the fan 14 and booster compressor 16. A core engine 15 typically includes, in downstream serial flow communication, the high pressure compressor 18, the annular combustor 20, and the HPT 22.

Figure 3:
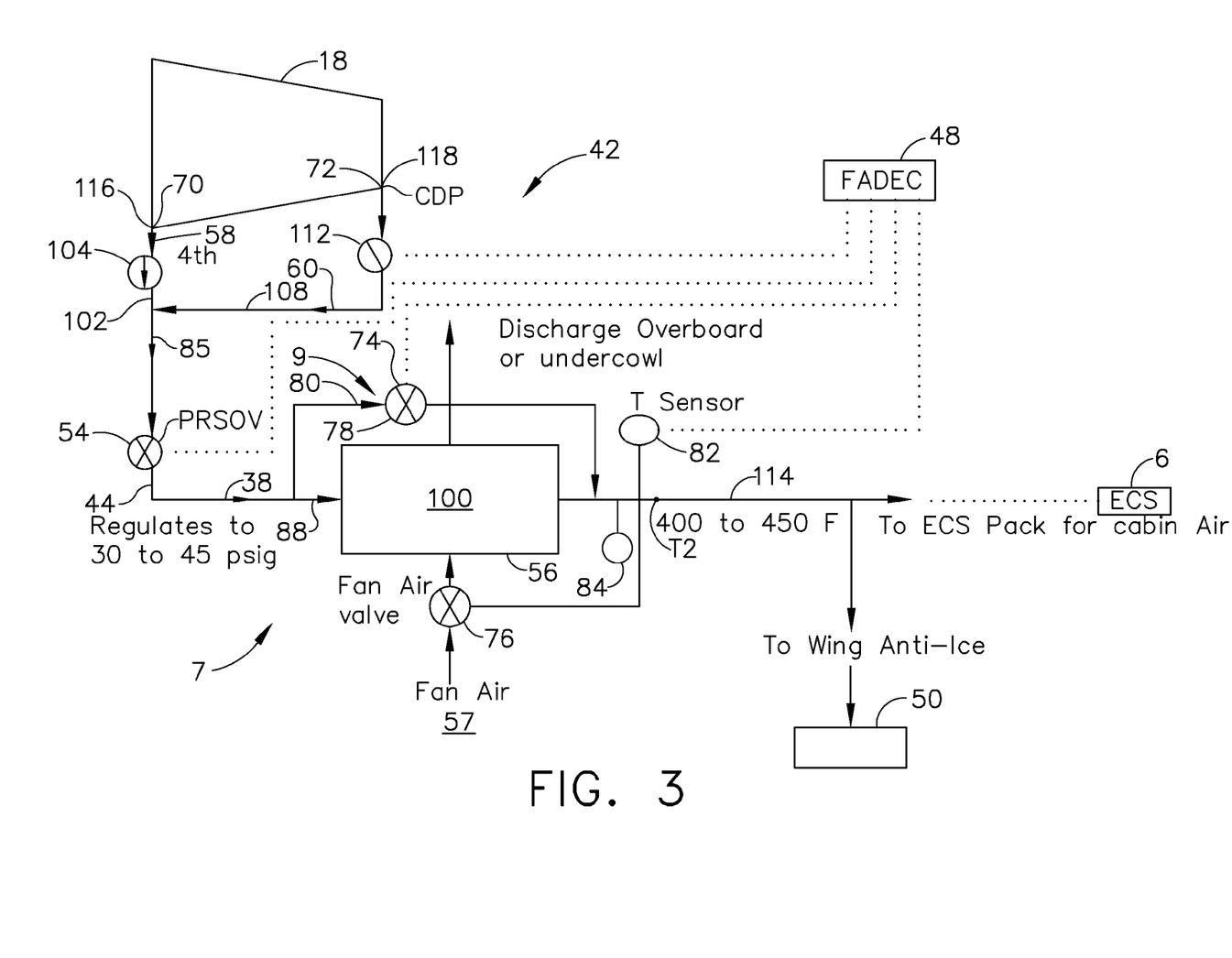
FIG. 3 is an enlarged schematical view illustration of the compressor bleed air supply system illustrated in FIG. 2 and an wing anti-icing system.

Referring to FIGS. 1 and 3, during operation, ambient air 34 enters the inlet of the engine and is pressurized in part by the fan 14 into fan air 33 of which a great part 31 is discharged through the bypass duct 28 for providing a majority of propulsion thrust. A first portion 35 of the fan air 33 passing the fan enters the booster compressor 16 and undergoes a further compression cycle in the multiple axial stages thereof, with additional compression also being provided in the HP compressor 18 in the multiple axial stages thereof.

The pressurized first portion 35 of fan air 33 is discharged as compressor discharge air 37 from the HP compressor 18 and suitably mixed with fuel in the combustor 20 for generating hot combustion gases 36. Energy is extracted from the hot combustion gases 36 in the HPT 22 to drive the first drive shaft 30 and power the HP compressor 18. Additional energy is extracted from the combustion gases in the LPT 24 to drive the second shaft 32 and power the fan 14 and booster compressor 16.

Figure 2:
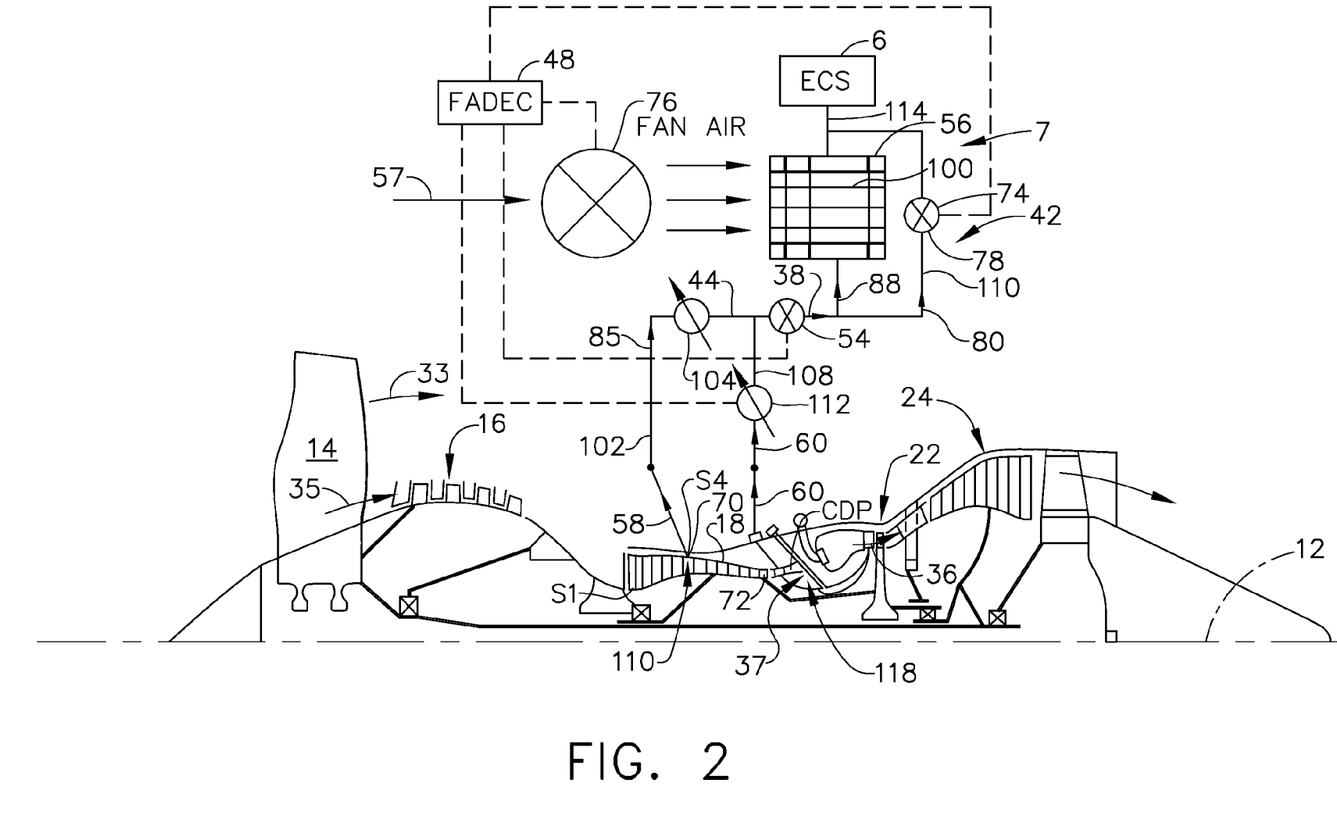
FIG. 2 is an sectional schematic view illustration of the compressor bleed air supply system illustrated in FIG. 1.

Generally illustrated in FIGS. 1, 2 and 3, is an environmental control system 6 (ECS) within the aircraft 8 and which is supplied with compressor bleed air 38 by a compressor bleed air supply system 42. The compressor bleed air supply system 42 includes a compressor air supply precooler 7 which may be used to cool the compressor bleed air 38. An electronic control 48 is used to control the operation of the compressor bleed air supply system 42. The electronic control 48 may be located on the engine such as a full authority digital engine control commonly referred to as a FADEC or an aircraft flight control. The electronic control 48 is used to control full or partial opening and closing of various valves incorporated in the compressor bleed air supply system 42.

The precooler 7 includes an air-to-air heat exchanger 56 in fluid communication with a source of cooling air 57 which is illustrated as a portion of the fan air 33. The heat exchanger 56 is suitably mounted in flow communication with the annular bypass duct 28. The precooler 7 also includes a variable precooler bypass 9 that may be used to bypass the compressor bleed air 38 around the heat exchanger 56.

The air-to-air heat exchanger 56 is illustrated herein as being disposed inside a core cowl 61 surrounding the core engine 15 at a base of struts 63 supporting the nacelle 26 and in suitable flow communication with the bypass duct 28. A suitable inlet scoop or door 65 in the core cowl 61 operates as a variable fan air valve 76 controlled by the electronic control 48. The variable fan air valve 76 modulates and channels the cooling air 57 downstream through the heat exchanger 56. The cooling air 57 is then conveyed through an outlet channel 66 returning the cooing air 57 to the bypass duct 28 upstream of a fan outlet 68 at a trailing edge 69 of the nacelle 26.

The heat exchanger 56 is used to cool the compressor bleed air 38 from the HP compressor 18 with the portion of the fan air 33 from the bypass duct 28. The cooled compressor bleed air 38 is then flowed to the environmental control system 6 for use therein. The compressor bleed air 38 is bled from one of two separate stages of the HP compressor 18. Relatively low pressure bleed air 58 is illustrated herein as being bled from an intermediate or lower pressure stage 70 of the HP compressor 18. Relatively high pressure bleed air 60 illustrated herein is bled from a higher pressure stage 72 which is illustrated herein as a last stage of the HP compressor 18. The relatively high pressure bleed air illustrated herein is compressor discharge pressure (CDP) air.

The lower pressure bleed air stage of the HP compressor 18 illustrated herein is a fourth stage S4 of the HP compressor 18 but another stage may be used. An intermediate stage of the HP compressor 18 is defined herein as a stage between a first stage S1 and a last stage SCDP of the of the HP compressor 18. The intermediate stage and last stage SCDP serve and low and high pressure bleed air sources 116, 118 of compressor bleed air 38. The variable precooler bypass 9 includes a variable bypass valve 74 disposed between the low and high pressure bleed air sources 116, 118 and the environmental control system 6.

One of low and high pressure bleed lines 102, 108 convey the relatively low or high pressure bleed air 85, 60 to a bleed air inlet line 44 in which either the low or high pressure bleed air 85, 60 respectively is conveyed to the compressor air supply precooler 7 as the compressor bleed air 38. Low and high pressure bleed shutoff valves 104, 112 are disposed in the low and high pressure bleed lines 102, 108 between the lower and higher pressure stages 70, 72 respectively and the bleed air inlet line 44. The low and high pressure bleed shutoff valves 104, 112 allow the low and high pressure bleed lines 102, 108 to be individually opened and closed.

The low pressure bleed shutoff valve 104 is typically a one way check valve designed to close when the high pressure bleed shutoff valve 112 is opened. The high pressure bleed shutoff valve 112 is controlled by the electronic control 48. The high pressure bleed shutoff valve 112 is opened by the electronic control 48 when a pressure of the compressor bleed air 38 is lower than a minimum called for in the control logic in the electronic control 48. The pressure of the compressor bleed air 38 may be measured by a pressure sensor such as one that is incorporated in a regulating shut off valve 54 (PRSOV).

The bleed air inlet line 44 connects to a heat exchanger cooling circuit 100 in the air-to-air heat exchanger 56 for cooling the compressor bleed air 38 when called upon to do so. The pressure regulating shut off valve 54 (PRSOV) is operably disposed in the bleed air inlet line 44 between the low and high pressure bleed shutoff valves 104, 112 and the heat exchanger 56 for regulating an inlet pressure of the compressor bleed air 38 entering the heat exchanger cooling circuit 100. The pressure regulating shut off valve 54 maintains the inlet pressure in a range for example 30 to 45 psig. The PRSOV typically contains its own pressure sensor and the range in which it shuts off the pressure regulating shut off valve 54 is controlled by the electronic control 48.

A bypass line 110 around the heat exchanger cooling circuit 100 and the air-to-air heat exchanger 56 extends from the bleed air inlet line 44 to a bleed air outlet line 114 from the heat exchanger cooling circuit 100. The bleed air outlet line 114 connects the heat exchanger cooling circuit 100 and compressor air supply precooler 7 to the environmental control system 6. The bypass line 110 is connected to the bleed air inlet line 44 between the pressure regulating shut off valve 54 and the heat exchanger cooling circuit 100. The bypass line 110 is connected to the bleed air outlet line 114 between the air-to-air heat exchanger 56 and the environmental control system 6. The bypass line 110 allows a portion or all of the compressor bleed air 38 to be flowed around or bypass the heat exchanger cooling circuit 100 and the air-to-air heat exchanger 56.

The bleed air outlet line 114 is operable for conveying or flowing the compressor bleed air 38 to the environmental control system 6 from the compressor air supply precooler 7. The bleed air outlet line 114 is illustrated herein as also being operably connected to an aircraft wing anti-icing system 50 for providing a relatively warm portion of the compressor bleed air 38 to prevent icing of the wing.

The variable precooler bypass 9 includes the bleed air bypass line 110 connecting the bleed air inlet line 44 to the bleed air outlet line 114 while bypassing the heat exchanger 56. The variable precooler bypass 9 further includes the variable bypass valve 74, illustrated in FIGS. 1-5, as a bypass throttle valve 78 disposed in the bleed air bypass line 110 between the bleed air inlet line 44 and the bleed air outlet line 114. The bypass throttle valve 78 is operable for modulating bypass bleed air flow 80 in the bleed air bypass line 110. The bypass throttle valve 78 also controls a split of the compressor bleed air 38 between a cooling air portion 88 of the compressor bleed air 38 entering the heat exchanger cooling circuit 100 and the bypass bleed air flow 80 entering the bleed air bypass line 110. The resistance through the heat exchanger cooling circuit 100 and the variable resistance provided by the bypass throttle valve 78 controls the split to vary as the bypass throttle valve 78 is adjusted. The bypass throttle valve 78 is controlled by the electronic control 48.

A temperature sensor 82 is operably connected to the bleed air outlet line 114 downstream of the bleed air bypass line 110 for measuring a precooler exit temperature T2 of the compressor bleed air 38 before it is conveyed to the environmental control system 6. The temperature sensor 82 is connected to the electronic control 48 and the controller opens or closes or throttles the bypass bleed air flow 80 in bleed air bypass line 110 using the bypass throttle valve 78 and based at in part on the temperature measured by the temperature sensor 82. An optional pressure sensor 84 may be operably connected to the bleed air outlet line 114 downstream of the bleed air bypass line 110 for measuring a precooler exit pressure which may be used to measure pressure differential across the compressor air supply precooler 7.

The temperature sensor 82 is also used by the electronic control 48 to control and open or close or throttle the variable fan air valve 76 based at in part on the precooler exit temperature T2 measured by the temperature sensor 82. The electronic control 48 controls and operates the bypass throttle valve 78 and the variable fan air valve 76 to maintain the precooler exit temperature T2 in a predetermined or desired range. An exemplary range of precooler exit temperature T2 is 400-450 degrees Fahrenheit.

The function of the compressor bleed air supply system 42 is to supply compressor bleed air 38 to the environmental control system 6 (ECS) and optionally to the aircraft wing anti-icing system 50. The compressor bleed air 38 must be supplied at sufficient flow rates and temperatures to meet environmental control system and optionally aircraft wing anti-icing requirements under normal and abnormal operating conditions.

The air-to-air heat exchanger 56 of the precooler 7 is a very heavy piece of equipment and the precooler bypass 9 allows a smaller lighter weight air-to-air heat exchanger 56 to be used. Conventional precooler heat exchangers are made from Inconel in order to withstand heat and pressure of CDP air the precooler heat exchanger disclosed herein may be constructed of Aluminum or Titanium. The various lines disclosed herein are metal pipes or ducts as they are referred to in the aircraft and aircraft gas turbine engine industries.

Referring to FIG. 3, during normal cruise operation of the aircraft, the compressor bleed air 38 for use in the environmental control system 6 is taken only from the low pressure bleed air 58, illustrated herein as being bled from the fourth stage S4 of the HP compressor 18, which is cheaper in terms of fuel consumption than using the CDP air. If the electronic control 48 determines that the flow rate of the low pressure bleed air 58 is insufficient, it then opens the high pressure bleed shutoff valve 112 which causes the low pressure bleed shutoff valve 104 to close. The electronic control 48 then operates the bypass throttle valve 78 and the variable fan air valve 76 to maintain the precooler exit temperature T2 in the predetermined or desired range.

Figure 4:
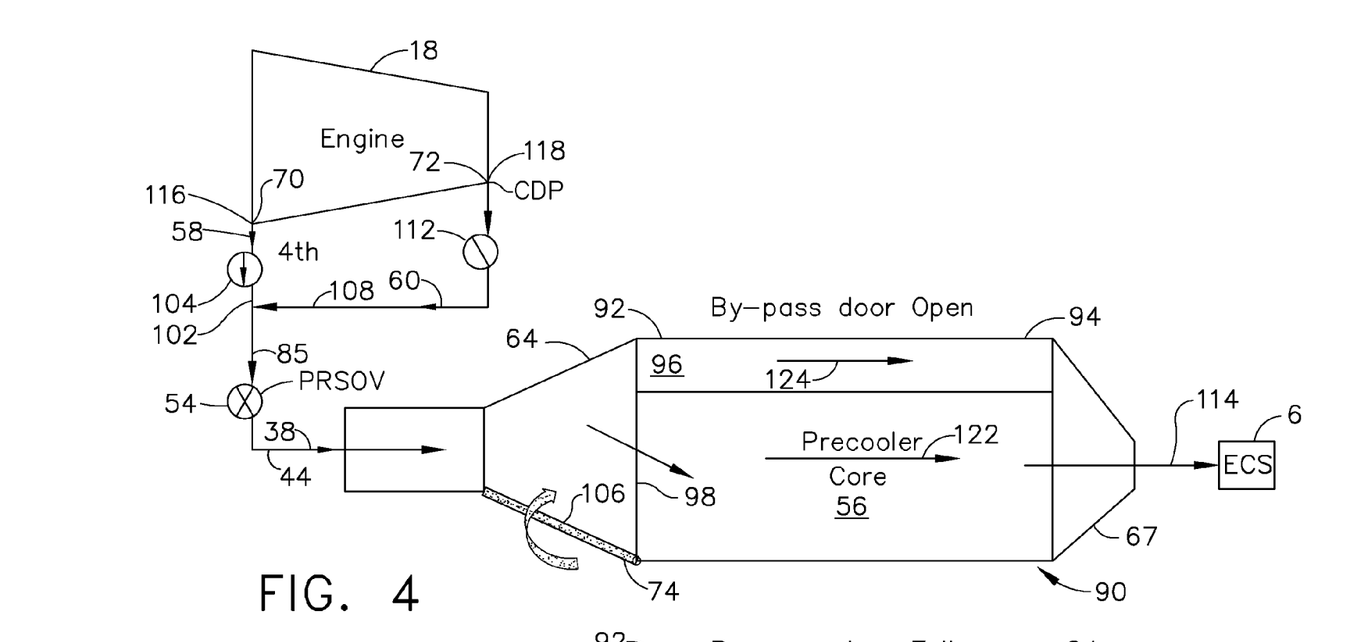
FIG. 4 is a schematical view illustration of an alternative precooler and alternative precooler bypass including a bypass door in an open position.
Figure 5:
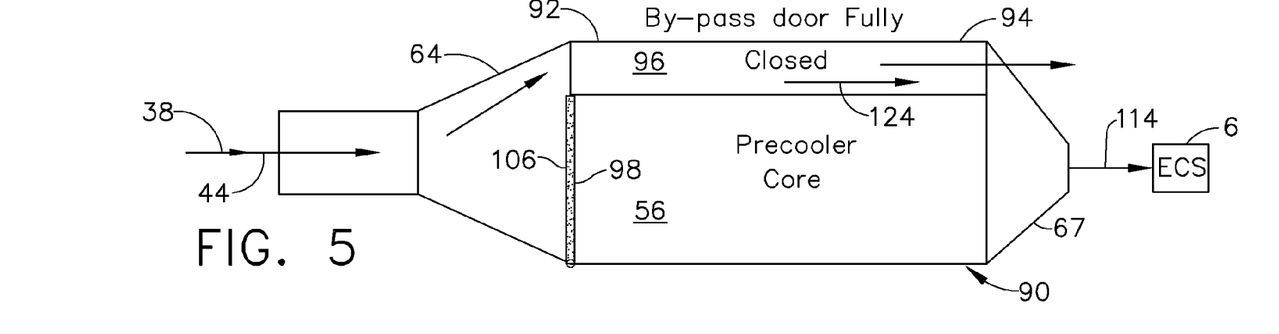
FIG. 5 is a schematical view illustration of the alternative precooler and the alternative precooler bypass illustrated in FIG. 4 with the bypass door in a closed position.

Illustrated in FIGS. 4 and 5 is an integrated precooler 90 including an integrated variable precooler bypass 92 for bypassing the compressor bleed air 38 around the heat exchanger 56 also referred to as a precooler core. The bleed air inlet line 44 connects a diffuser 64 which leads to the air-to-air heat exchanger 56 for cooling the compressor bleed air 38 when called upon to do so. A housing 94 in part bounds a bypass duct 96 and the heat exchanger 56. The bypass duct 96 and the heat exchanger 56 are in parallel flow relationship and exhaust into an exhaust outlet 67 of the integrated precooler 90. The bleed air outlet line 114 connects the exhaust outlet 67 to the environmental control system 6. The variable bypass valve 74 is a bypass door 106 operable to open and close an entrance 98 to the heat exchanger 56. The bypass door 106 modulates or controls a bypass portion 124 of the compressor bleed air 38 that enters the bypass duct 96 and is bypassed around the heat exchanger 56. The bypass door 106 also controls how much of the compressor bleed air 38 passes through the heat exchanger 56 denoted as a cooled portion 122 of the compressor bleed air 38. The bypass door 106 is illustrated in open and closed positions in FIGS. 4 and 5 respectively.

Figure 6:
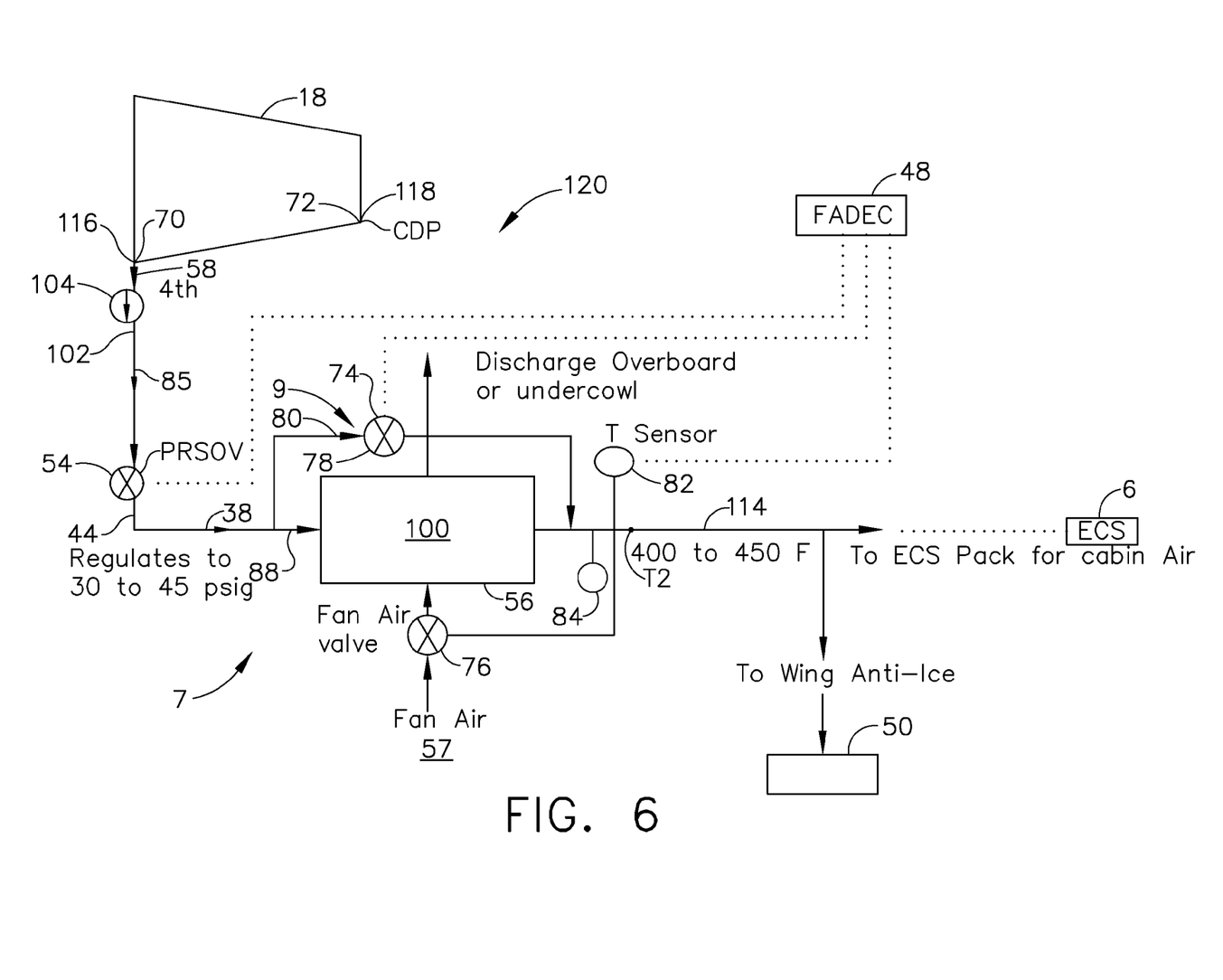
FIG. 6 is a schematical view illustration of an alternative compressor bleed air supply system.

Illustrated in FIG. 6 in an alternative single source compressor bleed air supply system 120. The single source compressor bleed air supply system 120 uses only a single low pressure source for the compressor bleed air 38 which is from an intermediate stage or lower pressure bleed air stage of the HP compressor 18 illustrated herein as a fourth stage S4 of the HP compressor 18 but another stage may be used. The engine is operated at a higher thrust level than that required if CDP or other relatively high pressure bleed air is used as a second source for the compressor bleed air supply system 42 illustrated in FIG. 1-5. This typically would occur when one of the engines is out and during a heavy hold engine operating condition such as on approach to landing or loitering such as in a traffic pattern around an airport waiting to land.

For example, if the pressure of the compressor bleed air 38 from the single low pressure source for the compressor bleed air 38, such as fourth stage S4 of the HP compressor 18, is below a predetermined or minimum level, then rather than using CDP air for the ECS the pilot or operator of the aircraft can increase the thrust level of the engine 10 sufficiently to meet the proper or desired level of pressure of the compressor bleed air 38 from the single low pressure source. The pressure of the compressor bleed air 38 may be measured by a pressure sensor such as one that is incorporated in the regulating shut off valve 54 (PRSOV).

The design conditions for sizing the compressor air supply precooler 7 and more particularly the air-to-air heat exchanger 56 is the one engine out heavy hold engine operating condition for a fully loaded aircraft.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. A gas turbine engine compressor bleed air supply system comprising:
    a compressor air supply precooler for cooling compressor bleed air from a bleed air source and operably connected in supply flow communication with an environmental control system operable for conditioning cabin air and/or providing cooling for avionics and/or other equipment,
    a bleed air outlet line connecting the compressor air supply precooler to the environmental control system,
    the precooler including an air-to-air heat exchanger in fluid communication with a source of cooling air and operable for cooling the compressor bleed air,
    the source of cooling air being a fan of the gas turbine engine,
    a variable bypass valve disposed between the bleed air source and environmental control system, and
    the variable bypass valve operable for bypassing at least a portion of the compressor bleed air around the heat exchanger.

2. A gas turbine engine compressor bleed air supply system as claimed in claim 1 further comprising:
    the bleed air source being a low pressure bleed air source disposed between first and last stages of a compressor,
    the cooling air being a portion of fan air from the fan, and
    a variable fan air valve disposed between the source of cooling air and the heat exchanger.

3. A gas turbine engine compressor bleed air supply system as claimed in claim 2 further comprising the bleed air source being selectable between the low pressure bleed air source and a high pressure bleed air source.

4. A gas turbine engine compressor bleed air supply system as claimed in claim 3 further comprising the high pressure bleed air source being the last stage of the high pressure compressor.

5. A gas turbine engine compressor bleed air supply system comprising:
    a compressor air supply precooler for cooling compressor bleed air from a bleed air source and operably connected in supply flow communication with an environmental control system operable for conditioning cabin air and/or providing cooling for avionics and/or other equipment,
    a bleed air outlet line connecting the compressor air supply precooler to the environmental control system,
    the bleed air source being selectable between low and high pressure bleed air sources of a gas turbine engine high pressure compressor,
    the precooler including an air-to-air heat exchanger in fluid communication with a source of cooling air and operable for cooling the compressor bleed air,
    the source of cooling air being a fan of the gas turbine engine,
    a variable bypass valve disposed between the bleed air source and environmental control system, and
    the variable bypass valve operable for bypassing at least a portion of the compressor bleed air around the heat exchanger.

6. A gas turbine engine compressor bleed air supply system as claimed in claim 5 further comprising:
    the high pressure compressor including first and last stages and an intermediate stage therebetween,
    the low and high pressure bleed air sources being the intermediate and last stages,
    the cooling air being a portion of fan air from the fan, and
    a variable fan air valve disposed between the source of cooling air and the heat exchanger.

7. A gas turbine engine compressor bleed air supply system as claimed in claim 6 further comprising:
    a bleed air inlet line connected to and in selective flow communication with the low and high pressure bleed air sources,
    the bleed air inlet line connected to and in flow communication with a heat exchanger cooling circuit in the air-to-air heat exchanger for cooling the compressor bleed air,
    the bleed air outlet line connecting the heat exchanger cooling circuit to the environmental control system, and
    the variable bypass valve being a bypass throttle valve disposed in a bleed air bypass line between the bleed air inlet line and the bleed air outlet line.

8. A gas turbine engine compressor bleed air supply system as claimed in claim 7 further comprising:
    a high pressure bleed shutoff valve disposed in a high pressure bleed line between the high pressure bleed air source and the bleed air inlet line, and
    an electronic control controllingly connected to the bypass throttle valve and the variable fan air valve.

9. A gas turbine engine compressor bleed air supply system as claimed in claim 8 further comprising the electronic control controllingly connected to the high pressure bleed shutoff valve.

10. A gas turbine engine compressor bleed air supply system as claimed in claim 6 further comprising:

the precooler being an integrated precooler including an integrated variable precooler bypass for bypassing the compressor bleed air around the heat exchanger, a bleed air inlet line connected to and in selective flow communication with the low and high pressure bleed air sources, the bleed air inlet line connected to and in flow communication with a diffuser, the diffuser in selective flow communication with the air-to-air heat exchanger for cooling at least a portion of the compressor bleed air and in selective flow communication with a bypass duct in the integrated precooler, the heat exchanger and the bypass duct being in parallel flow relationship and in flow communication with an exhaust outlet of the integrated precooler, the bleed air outlet line connecting the exhaust outlet to the environmental control system, and the variable bypass valve including a bypass door disposed between the heat exchanger and the bleed air inlet line.

11. A gas turbine engine compressor bleed air supply system as claimed in claim 10 further comprising a high pressure bleed shutoff valve disposed in a high pressure bleed line between the high pressure bleed air source and the bleed air inlet line and an electronic control controllingly connected to the variable bypass valve and the variable fan air valve.

12. A gas turbine engine compressor bleed air supply system as claimed in claim 11 further comprising the electronic control controllingly connected to the high pressure bleed shutoff valve.

13. An aircraft comprising:
two or more aircraft gas turbine engines and an environmental control system within the aircraft,
each aircraft gas turbine engine including in serial flow communication a fan, a high pressure compressor, an annular combustor, a high pressure turbine for powering the high pressure compressor, and a low pressure turbine for powering the fan,
an annular nacelle surrounding the fan,
a core cowl surrounding the high pressure compressor, the combustor, and the high pressure turbine,
an annular bypass duct located radially between the annular nacelle and the core cowl,
a compressor air supply precooler for cooling compressor bleed air from a bleed air source in the high pressure compressor,
the compressor air supply precooler operably connected in supply flow communication with the environmental control system operable for conditioning cabin air and/or providing cooling for avionics and/or other equipment,
a bleed air outlet line connecting the compressor air supply precooler to the environmental control system,
the precooler including an air-to-air heat exchanger in fluid communication with a source of cooling air from the bypass duct,
the source of cooling air being a fan of the gas turbine engine,
the precooler operable for cooling the compressor bleed air,
a variable bypass valve disposed between the bleed air source and environmental control system, and
the variable bypass valve operable for bypassing at least a portion of the compressor bleed air around the heat exchanger.

14. An aircraft as claimed in claim 13 further comprising:
the source of cooling air being the fan located upstream of the bypass duct, the bleed air source being a low pressure bleed air source disposed between first and last stages of a compressor,
the cooling air being a portion of fan air from the bypass duct, and
a variable fan air valve disposed between the bypass duct and the heat exchanger.

15. An aircraft as claimed in claim 14 further comprising the bleed air source being selectable between the low pressure bleed air source and a high pressure bleed air source disposed between the low pressure bleed air source and the combustor.

16. An aircraft as claimed in claim 15 further comprising the high pressure bleed air source being the last stage of a compressor.

17. An aircraft as claimed in claim 15 further comprising:
a bleed air inlet line connected to and in selective flow communication with the low and high pressure bleed air sources,
the bleed air inlet line connected to and in flow communication with a heat exchanger cooling circuit in the air-to-air heat exchanger for cooling the compressor bleed air,
the bleed air outlet line connecting the heat exchanger cooling circuit to the environmental control system,
the variable bypass valve being a bypass throttle valve disposed in a bleed air bypass line between the bleed air inlet line and the bleed air outlet line,
a high pressure bleed shutoff valve disposed in a high pressure bleed line between the high pressure bleed air source and the bleed air inlet line, and
an electronic control controllingly connected to the bypass throttle valve and the variable fan air valve.

18. An aircraft as claimed in claim 17 further comprising further comprising the electronic control controllingly connected to the high pressure bleed shutoff valve.

19. An aircraft as claimed in claim 15 further comprising:
the precooler being an integrated precooler including an integrated variable precooler bypass for bypassing the compressor bleed air around the heat exchanger,
a bleed air inlet line connected to and in selective flow communication with the low and high pressure bleed air sources,
the bleed air inlet line connected to and in flow communication with a diffuser,
the diffuser in selective flow communication with the air-to-air heat exchanger for cooling at least a portion of the compressor bleed air and in selective flow communication with a bypass duct in the integrated precooler,
the heat exchanger and the bypass duct being in parallel flow relationship and in flow communication with an exhaust outlet of the integrated precooler,
the bleed air outlet line connecting the exhaust outlet to the environmental control system,
the variable bypass valve including a bypass door disposed between the heat exchanger and the bleed air inlet line,
a high pressure bleed shutoff valve disposed in a high pressure bleed line between the high pressure bleed air source and the bleed air inlet line, and
an electronic control controllingly connected to the variable bypass valve and the variable fan air valve.

20. An aircraft as claimed in claim 19 further comprising the high pressure bleed air source being the last stage of a compressor.

21. An aircraft as claimed in claim 20 further comprising the electronic control controllingly connected to the high pressure bleed shutoff valve.

22. A method for supplying compressor bleed air to an environmental control system of an aircraft:

flowing low pressure bleed air bled from a single low pressure source to a compressor air supply precooler for cooling the low pressure bleed air, flowing the low pressure bleed air to an environmental control system operable for conditioning cabin air and/or providing cooling for avionics and/or other equipment, flowing the low pressure bleed air through a bleed air outlet line connecting the compressor air supply precooler to the environmental control system, the precooler being an air-to-air heat exchanger in fluid communication with a source of cooling air and operable for cooling the compressor bleed air, the source of cooling air being a fan of the gas turbine engine, a variable bypass valve disposed between the bleed air source and environmental control system, the variable bypass valve operable for bypassing at least a portion of the compressor bleed air around the heat exchanger, the single low pressure source being an intermediate or lower pressure stage of a high pressure HP compressor wherein the intermediate or lower pressure stage is located between a first stage and a last stage of the of the high pressure HP compressor, detecting one engine out aircraft operating condition during approach or loitering of the aircraft, and increasing a thrust level of the engine sufficiently to meet a predetermined or calculated minimum level of pressure of the compressor bleed air from the single low pressure source.

\* \* \* \* \*